May 20, 1952 A. C. STOCKER 2,597,683

TELEVISION SCANNING APPARATUS

Filed Nov. 21, 1950

INVENTOR
Arthur C. Stocker
BY
Eric C. Mitchell
ATTORNEY

Patented May 20, 1952 2,597,683

UNITED STATES PATENT OFFICE 2,597,683

TELEVISION SCANNING APPARATUS

Arthur C. Stocker, Collingswood, N. J., assignor to Radio Corporation of America, a corporation of Delaware Application November 21, 1950, Serial No. 196,800

4 Claims. (Cl. 313—70)

This invention relates to cathode ray tube apparatus whereby the linearity of the scanning is increased.

It is generally assumed that the horizontal scanning of the cathode ray beam is linear. However, in practice it is extremely difficult to achieve perfection in deflection. Even if the sawtooth voltage wave or sawtooth current wave applied to the deflection apparatus is linear, the deflecting yoke and plates are not perfect and the general geometry of the tube itself introduces errors.

Systems have recently been used in which the wave of deflecting current is sampled and compared with the standard wave and the difference is fed back to the input circuit as a correction voltage. Although considerable improvement has resulted from this type of apparatus, errors due to imperfections in the yoke or deflecting elements and errors introduced by the geometry of the tube are still present.

In order to overcome the lack of linearity introduced by imperfections in the yoke and tube structures, G. L. Beers suggested in the United States Patent 2,385,563, issued on September 25, 1945, that a grid be placed near the target or screen in such a position as to be scanned by the electron beam. The grid was composed of relatively fine vertical wires placed so as to be intercepted by a non-focused portion of the beam. The diffusion produced by locating the grid at a non-focused part of the beam prevented an image of the grid from being sharply focused upon the target. As the beam scanned across the grid members, voltage pulses were developed that had a frequency depending upon the spacing of the grid wires and the velocity of the beam acros the grid. The voltage pulses thus generated were employed, as explained in the patent, to effect correction of the scanning voltage wave. The corrected voltage wave might not be a linear sawtooth voltage wave, but it would compensate for all the scanning errors induced by the irregularities of the tube and scanning systems.

In some types of tubes, such as Graphecons, it is customary to modulate the intensity of the beam by applying a suitable signal to the grid or cathode. In accordance with this invention, this function can be performed by a grid similar to that described in the Beers patent. Hence the grid can serve two functions.

In Graphecons, wherein the target is bombarded by both the writing and reading guns and serves as the output element for the latter, it is necessary to effect a separation of signals. When the writing beam writes a spot on the target it generates in the target output a video signal in no way different from that generated by the reading beam, except that the signal from the writing beam is many times the stronger.

In order to suppress this unwanted signal, it has been customary in employing Graphecons to completely modulate the reading beam at a carrier frequency lying outside the highest frequency in the video band. The Graphecon acts to further modulate this carrier with the video signals created by scanning the target. By tuning the target amplifier 35 so that it passes this carrier, plus and minus the desired side bands, the undesired writing-gun-video can be suppressed, and the desired video may be restored by detecting the amplifier output.

The carrier modulation of the beam mentioned above is usually achieved by impressing between grid and cathode of the reading gun about 20 volts of signal at the carrier frequency, usually near 30 megacycles. This signal is gotten from an R.-F. oscillator, but the inclusion of an R.-F. oscillator in the same equipment with a very sensitive amplifier operating at the same frequency necessitates extensive shielding that is both troublesome and expensive.

In accordance with this invention, the function of generating a signal for the correction of sweep errors, and the function of modulating the reading beam at a carrier frequency, may be performed by a properly constructed grid. The advantages of this invention are that the first function may be performed without the introduction of undesired vertical bars in the picture, and that the second function may be performed without the presence of an R.-F. oscillator to generate fields stronger than those inherent in the presence of the reading beam itself.

It is accordingly an object of my invention to provide an improved cathode ray tube apparatus whereby the linearity of scanning is improved.

It is a further object of my invention to provide improved cathode ray tube apparatus wherein a grid is inserted between the electron beam and the target, in such manner as to derive strong signals for sweep voltage correction and at the same time to aid in the operation of the tube.

Briefly, the above objectives may be obtained by focusing the electron beam by a magnetic field that is sufficiently strong to cause the beam to focus at at least one point before it reaches the target. If one of these focal points is a small distance from the target, the beam impinges on the target just slightly out of focus. However, the enlarged spot on the target is still small enough to be capable of representing the finest detail required. In order to develop scanning correction signals, it is proposed that a grid having a mesh that is finer than the finest detail to be represented by the beam be placed transverse to the beam at one of the focal points, preferably the focal point nearest the target. The grid wires are comparable in size to the cross section of the electron beam at the focal point, so that almost all of the beam current is intercepted by the grid wire and a strong signal generated. If the spacing of the grid wires is sufficiently small, the modulation thus produced on the electron beam by the grid will be a higher frequency than the information that is to be represented by the cathode ray beam.

A more detailed understanding of the operation of this invention may be derived from a consideration of the drawing in which.

Figure 1:
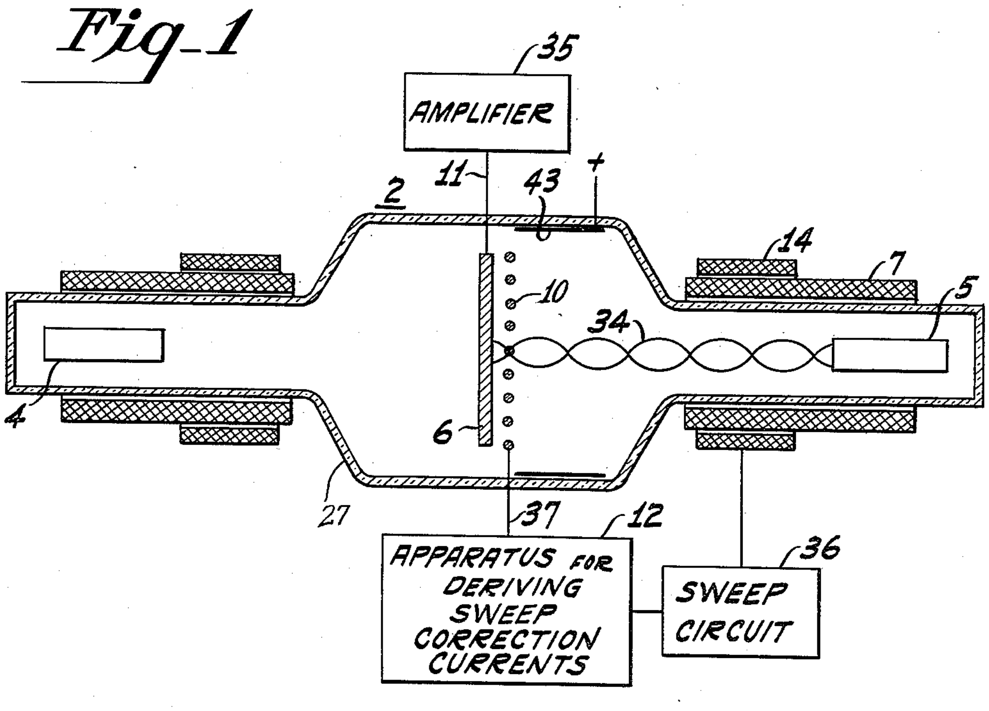
Figure 1 shows by block diagram one form of this invention.

In Figure 1 of the drawing there is shown an application of this invention to a cathode ray tube wherein information is put on to a target by a writing beam and extracted therefrom by a reading beam, as in the case of a Graphecon. Turning in more detail to Figure 1 there is shown in one extremity of a Graphecon tube 2 a writing electron gun 4, and in the other extremity of the tube 2 there is mounted a reading electron gun 5. At a point intermediate the two guns 4 and 5 is mounted a target 6. The electron beam projected by the reading gun 5 is focused by a magnetic field established by a field coil 7. This magnetic field can be made of such strength to cause the reading beam 34 formed by electrons projected by the electron gun 5 to have several crossover or focal points. A grid 10 is mounted in the envelope 27 in such manner that its plane is substantially parallel to the plane of the target 6 and at a point along the principal axis of the tube 2 at which one of the focal points of the reading electron beam 34 occurs.

Figure 2:
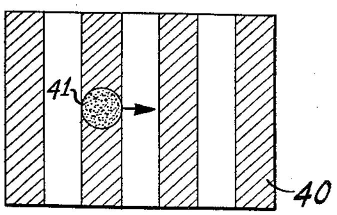
Figure 2 shows an enlargement of the target structure.

Figure 2 is an enlarged view of the grid structure 10 of Figure 1. The grid wires or elements 40 are larger or at least as large as the cross sectional area of the electron beam as indicated by the circle 41. The arrow indicates the direction of travel of the beam. It is not necessary that the beam move in a direction that is precisely perpendicular to the grid wires. The grid wires or elements 40 may be made of material having a secondary emission ratio that is greater than unity in which case a ring 43 that is connected to a source of positive potential is provided to collect the electrons emitted by the grid.

In order to prevent video signals produced at the target 6 by the writing beam projected by the gun 4 from being picked up in the lead 11 that is secured to the target 6, it has been customary in employing Graphecons to modulate the intensity of the reading beam 34 by applying to an intensity control electrode a carrier frequency lying far outside of the highest signal frequency to be handled by the Graphecon. The desired signals can be separated out by detecting the modulation of this carrier. For example, if the carrier frequency is 30 megacycles, the target amplifier 35 is set up to operate at 30 megacycles and the desired information is separated by a detector at its output.

Although convenience in drawing has required this grid 10 to be shown as a very coarse mesh, it is a specification of this invention that the grid be of finer mesh than the finest detail it is desired to read from the target 6.

About the tube 2 in the space between the writing gun 5 and the target 6 is placed a deflecting yoke which, as is customary in the art, is supplied with current of sawtooth waveshape by the sweep circuit 36.

Sources for the other sweep currents, the Graphecon operating currents, the necessary synchronizing pulses, and all the other paraphernalia required for the operation of a Graphecon equipment are not shown but are to be understood to be present.

In operation the sweep circuit 36 and the yoke 14 act to cause the beam 34 to move across the face of the target and hence across the grid. In Figure 1 the movement is considered to be in the plane of the paper, so that in its travel the beam alternately passes through the interstices in the grid and impinges on a grid wire. As specified, these grid wires are essentially the same diameter as the electron beam, so essentially all the electrons in the beam are collected, and an appreciable current flows along the wire 37 to the apparatus for deriving sweep correction currents 12. As has been disclosed in Beers' Patent 2,385,563 referred to above, these pulses of current may be used to effect a correction of any imperfections existing in the sweep, no matter what their cause.

As was mentioned in the paragraph above, when the beam strikes one of the wires of the grid 10, essentially all the electrons of the beam are captured, leaving practically none to strike the target 6. As the beam scans the target under influence of the sweep circuit 36, it strikes the target in bursts, alternating between full strength and practically zero at a frequency determined by the product of the sweep velocity in inches per second and the grid mesh in wires per inch. This frequency may be expressed in terms more familiar to the electrical engineer as the product of the fundamental frequency of the sweep circuit 36 by the total number of wires in the grid 10, the product then being increased by the ratio of the return time to the rise time of the sweep wave. By these means the beam is modulated almost completely, and it would be complete if all the electrons were intercepted by the grid wires, at a control frequency and without there being in the equipment any currents or voltages stronger than those in the electron beam itself.

Although it has been stated that the grid wires absorb the electrons from the beam, this must not be construed as limiting. Satisfactory operation may be had if the wires of the grid are of such a material that they emit a large secondary emission current. As a matter of fact an increase in the synchronizing signal may be so produced. It is important, however, that these secondary electrons be not allowed to fall on the target.

Having thus described my invention, what is claimed is:

1. Cathode ray tube apparatus comprising in combination an evacuated envelope, a target mounted within said envelope, an electron gun adapted to direct a beam of electrons toward said target, means for establishing a magnetic field along the line of the beam so as to focus said beam, said magnetic field being sufficiently strong to focus the beam at a plurality of points along its path, a grid comprised of parallel members, said grid being mounted so that the parallel members are perpendicular to the direction normally scanned by the beam as it traces a raster, said grid being mounted in a plane that is in focus and parallel to and separate from the face of said target and at a focal point of said beam.

2. Cathode ray tube apparatus as described in claim 1 in which said parallel members are uniformly spaced so that the frequency with which they are crossed by the scanning of the electron beam is greater than the highest frequency in the information to be represented by said beam.

3. Cathode ray tube apparatus comprising in combination an evacuated envelope, a first electron gun mounted at one extreme of said envelope, and a second electron gun mounted at another extreme of said envelope, a target mounted between said guns, the beams from each of said guns being directed toward opposite sides of said target, means for magnetically focusing the first of said beams, the strength of the magnetic field employed being sufficient to cause at least one crossover between said first gun and said target, and a grid of parallel members mounted between said first gun and said target at one of the said crossover points.

4. Cathode ray tube apparatus as set forth in claim 3 in which the grid members are uniformly spaced at intervals such that the frequency with which the beam crosses them is higher than the highest frequency of the information to be represented by either beam on said target.

ARTHUR C. STOCKER.

REFERENCES CITED

The following references are of record in the file of this patent:

UNITED STATES PATENTS

| Number | Name | Date |
|---|---|---|
| 2,213,178 | Iams | Aug. 29, 1940 |
| 2,307,188 | Bedford | Jan. 5, 1943 |
| 2,446,249 | Schroeder | Aug. 3, 1948 |
| 2,446,440 | Swedlund | Aug. 3, 1948 |
| 2,461,515 | Bronwell | Feb. 15, 1949 |
| 2,463,535 | Hecht | Mar. 8, 1949 |
| 2,518,200 | Sziklai et al. | Aug. 8, 1950 |